(No Model.)

F. N. STILL.
Gate Pivot.

No. 228,951 Patented June 15, 1880.

WITNESSES:
Henry N. Miller
C. Sedgwick

INVENTOR:
F. N. Still
BY Munn & Co
ATTORNEYS.

UNITED STATES PATENT OFFICE.

FRANCIS N. STILL, OF LAKE CITY, ILLINOIS, ASSIGNOR TO HIMSELF AND JEREMIAH J. NICHOLSON, OF SAME PLACE.

GATE-PIVOT.

SPECIFICATION forming part of Letters Patent No. 228,951, dated June 15, 1880.

Application filed March 29, 1880. (No model.)

*To all whom it may concern:*

Be it known that I, FRANCIS NELSON STILL, of Lake City, in the county of Moultrie and State of Illinois, have invented a new and useful Improvement in Gate-Pivots, of which the following is a specification.

The object of my invention is to provide a new and improved gate-pivot which is simple in construction and effective in use.

The invention consists of a gate-pivot formed of a conical socket secured in the top of the gate-post, and containing a ball supporting a conical stud of a hood-shaped disk, upon which disk the top longitudinal bar of a balanced swinging gate rests.

Figure 1:
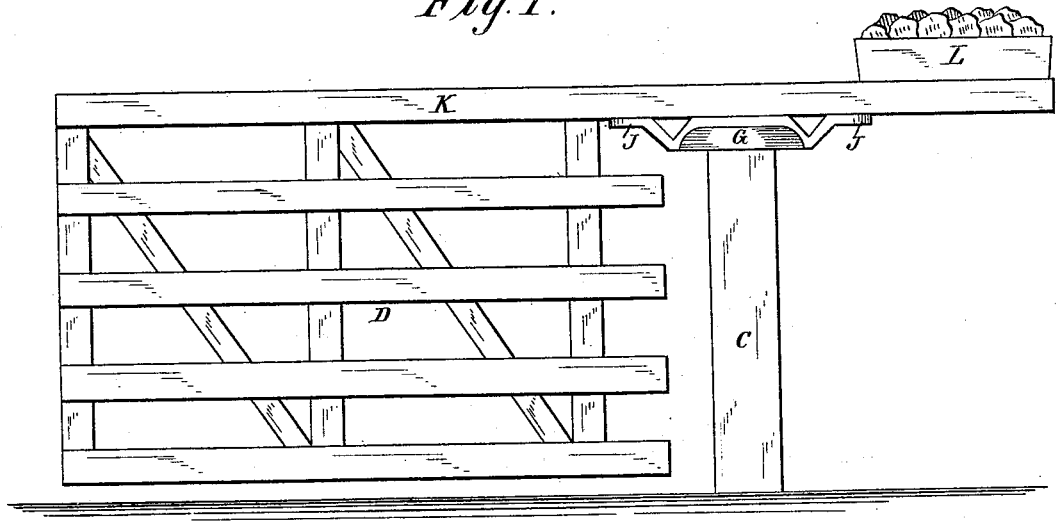
Figure 2:
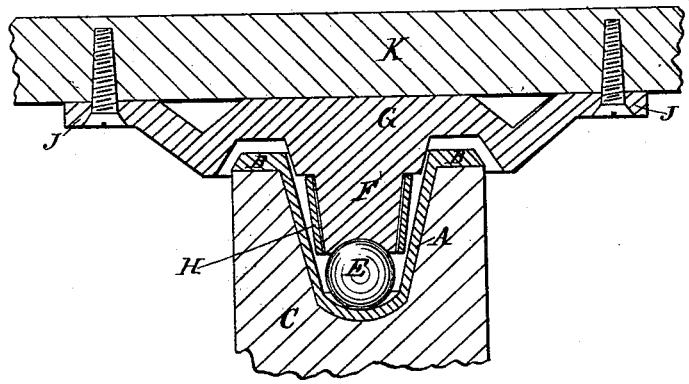
Figure 3:
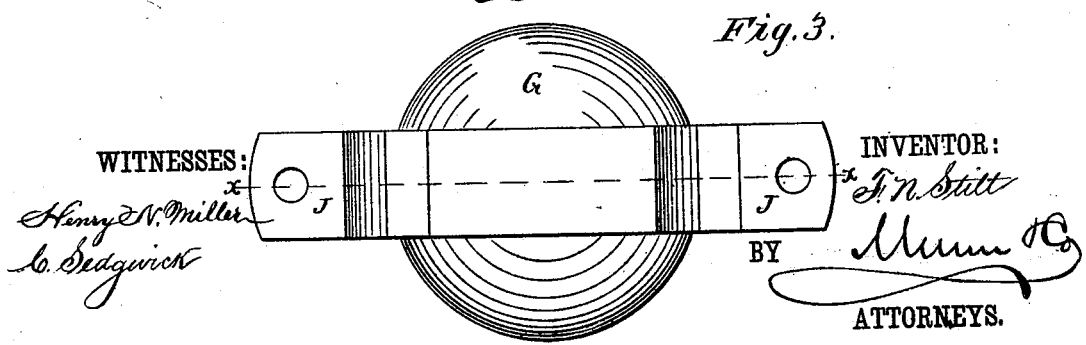

In the accompanying drawings, Figure 1 is a front elevation of a balanced swinging gate provided with my improved pivot. Fig. 2 is a cross-sectional elevation of my improved gate-pivot. Fig. 3 is a plan view of the same.

A metal socket, A, provided with an annular flange, B, is secured in the top of the post C of a balanced swinging gate, D, and contains a metal ball, E, which rests on the concave bottom of the socket A.

A conical stud, F, provided with a concave lower end, is made integral with or attached to a hood-shaped disk, G, provided with arms J J, and fits into the socket A, its lower end resting on the ball E.

The stud F is provided with a metallic sleeve, H, to prevent destructive friction between the socket A and the stud F.

The disk G is fastened to the under side of the top bar or beam, K, of the gate D at such a distance from the end of the beam K that the gate can be balanced on the post C by means of some suitable weight L on the short arm of the beam K.

The entire weight of the gate rests on the ball E, and the gate is rotated on the ball-and-socket joint formed by the stud F, ball E, and socket A.

A quantity of oil is placed into the socket A to insure an easy motion of the gate.

A gate made with the within-described pivot works very easily and without any side strain on the post or gate.

The oil in the socket A will last a very long time, as the hood-shaped disk G protects the cap and prevents ice, snow, or dirt from entering into the same.

Having thus described my invention, I claim as new and desire to secure by Letters Patent—

1. A gate-pivot made substantially as herein shown and described, and consisting of a conical socket, a ball contained therein, and of a conical stud fastened to or made integral with a hood-shaped disk, which stud fits into the socket and rests on the ball, as set forth.

2. The combination, with the top gate-bar, K, and gate-post C, of the conical socket A, ball E, and conical stud F, substantially as herein shown and described, and for the purpose set forth.

FRANCIS NELSON STILL.

Witnesses:
W. G. COCHRAN,
L. W. KEYES.